United States Patent
Green, Jr.

(10) Patent No.: US 9,940,796 B2
(45) Date of Patent: Apr. 10, 2018

(54) YELLOW FELLOW SAFETY SIGN

(71) Applicant: Eddie Melvin Green, Jr., Jeffersonville, IN (US)

(72) Inventor: Eddie Melvin Green, Jr., Jeffersonville, IN (US)

(73) Assignee: Eddie Melvin Green, Jr., Jeffersonville, IN (US)

( * ) Notice: Subject to any disclaimer, the term of this patent is extended or adjusted under 35 U.S.C. 154(b) by 0 days.

(21) Appl. No.: 15/255,154

(22) Filed: Sep. 2, 2016

(65) Prior Publication Data
US 2018/0068536 A1   Mar. 8, 2018

(51) Int. Cl.
| G08B 5/36 | (2006.01) |
| G08B 7/06 | (2006.01) |
| G09F 27/00 | (2006.01) |
| G09F 15/00 | (2006.01) |
| H04N 7/18 | (2006.01) |
| G09F 13/22 | (2006.01) |
| E01F 13/02 | (2006.01) |

(52) U.S. Cl.
CPC ............ *G08B 5/36* (2013.01); *G08B 7/06* (2013.01); *G09F 15/0062* (2013.01); *G09F 27/00* (2013.01); *G09F 27/004* (2013.01); *G09F 27/005* (2013.01); *G09F 27/007* (2013.01); *H04N 7/188* (2013.01); *E01F 13/022* (2013.01); *G09F 2013/222* (2013.01); *G09F 2027/001* (2013.01)

(58) Field of Classification Search
CPC ...... G09F 15/0062; G09F 19/22; G09F 27/00; G09F 2027/001; G09F 27/004; G09F 27/005; G09F 27/007; G09F 2007/1873; G09F 2013/222; G08B 7/06; E01F 13/022
See application file for complete search history.

(56) References Cited

U.S. PATENT DOCUMENTS

| 4,954,813 A | * | 9/1990 | August, Sr. | G08B 7/06 340/571 |
| 7,755,471 B2 | * | 7/2010 | Jackson | G08B 3/10 340/384.1 |
| 9,548,011 B1 | * | 1/2017 | Banks | G09F 27/005 |
| 2003/0115783 A1 | * | 6/2003 | Woosley | G09F 7/00 40/584 |
| 2004/0163292 A1 | * | 8/2004 | Wilson | G08B 3/1008 40/597 |
| 2006/0107575 A1 | * | 5/2006 | Ashley | G09F 15/0062 40/612 |
| 2006/0132322 A1 | * | 6/2006 | Jackson | G08B 3/10 340/692 |
| 2008/0157945 A1 | * | 7/2008 | Bowler | B60Q 1/0023 340/433 |
| 2008/0271338 A1 | * | 11/2008 | Muir | F26B 21/001 34/201 |
| 2015/0015406 A1 | * | 1/2015 | Furtado | G08B 7/06 340/691.5 |
| 2016/0247366 A1 | * | 8/2016 | Munoz | G08B 5/36 |

* cited by examiner

Primary Examiner — John Villecco

(57) ABSTRACT

A portable wet floor caution sign and attention getting warning devise that includes at least two rigid panels mounted at the top end. Audible voice box to speak multiple languages/beeping sounds, a rotating camera and visual signaling flashing lights devices can be mounted on the panels and can be activated by a motion sensor and or moister sensors circuits and therefore may include off and on sequencing switches powered by a solar charged battery pack.

4 Claims, 8 Drawing Sheets

YELLOW FELLOW SAFETY SIGN

FIELD OF INVENTION

This invention relates in general to reducing slips and falls on wet floors and more particularly to a portable wet floor safety sign to be placed near a wet floor area to pre-warn pedestrians especially the blind and the hearing impaired of a hazardous condition.

BACKGROUND OF INVENTION

Floors those are wet after a cleaning, or due to spills this can cause a safety hazard for pedestrians especially the blind and the hearing impaired. And these hazards resulting in potential major liabilities for the business owners and/or operators, even death.

Reasonable precautions are normally exercised by placement of caution signs in the general vicinity of the wet floor but these have become so common place that there are often unnoticed or ignored. Also U.S. Design Pat. No. 328,615 granted Aug. 11, 1992 to Joe E. Taylor teaches a combined portable floor sign and fan presumably intended for that purpose; however, the design does not actively communicate to customers the danger such as by flashing lights or audible sound signals as voice and beeping.

SUMMARY OF INVENTION

In keeping with the foregoing there is provided a wet floor safety device that has at least a pair of front and back rigid panels each connected at their upper ends, an automatic off and on switch, comprising a power supply solar charged battery pack. At least two are rotating cameras mounted on and located within the front and back panels, and has an audible voice box attention getting device that can be mounted on the panel housing for generating an audible beeping signal, multiple flashing lights are displayed on both sides of the panels acting as an early warning visual device. Furthermore a motion sensor/detector may be used to activate the wet floor safety device(s) in response to the motion of a pedestrian especially the blind and the hearing impaired in the vicinity of said device. A moisture sensor detection device may also be incorporated within the device. The object of the present invention is to provide an early warning getting the attention of the pedestrians that in potential danger.

The foregoing and other objects and advantages of the invention will be set forth in or apparent from the following description.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENTS

Figure 1:
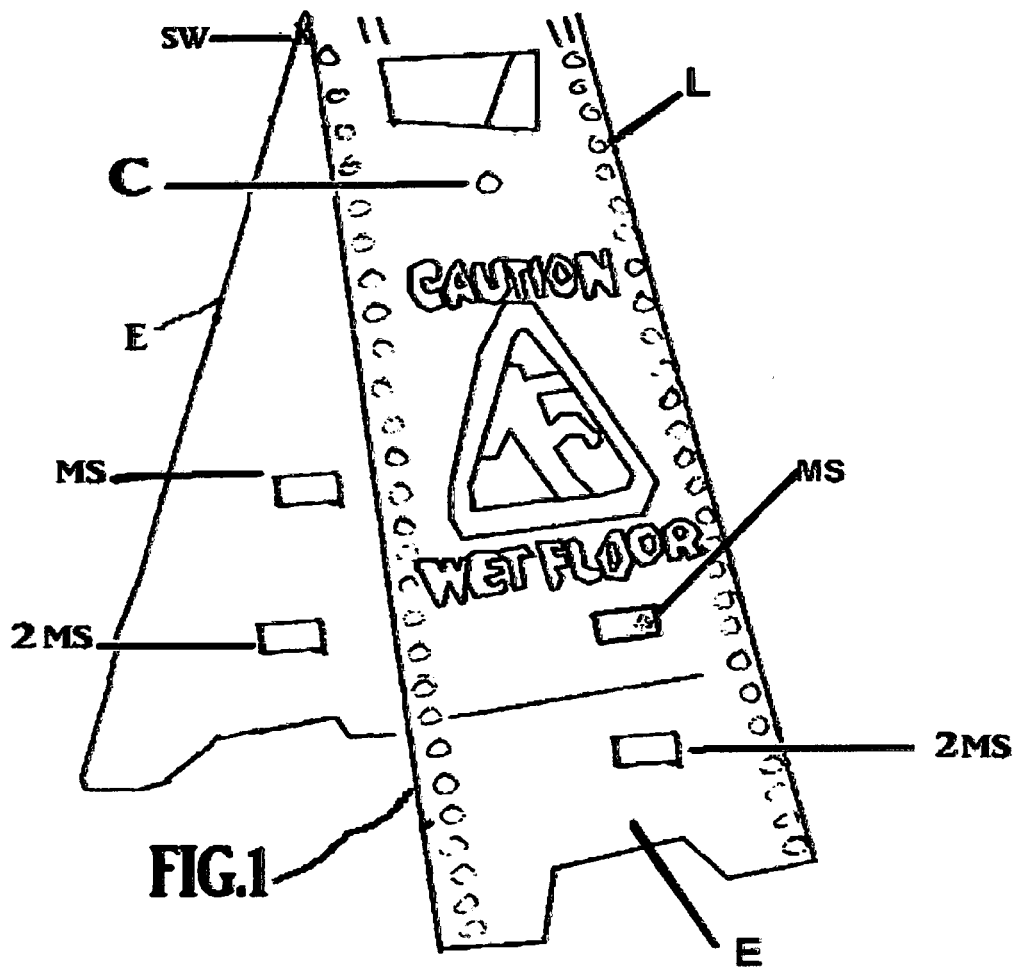
FIG. 1 is an oblique view of the portable wet floor early warning unit of the present invention showing the multiple lights (L) on each side of said rigid panels (E), motion sensor/detector (2MS), moisture sensor detection device (MS), at least one rotating camera (C), automatic off and on switch (SW)
Figure 2:
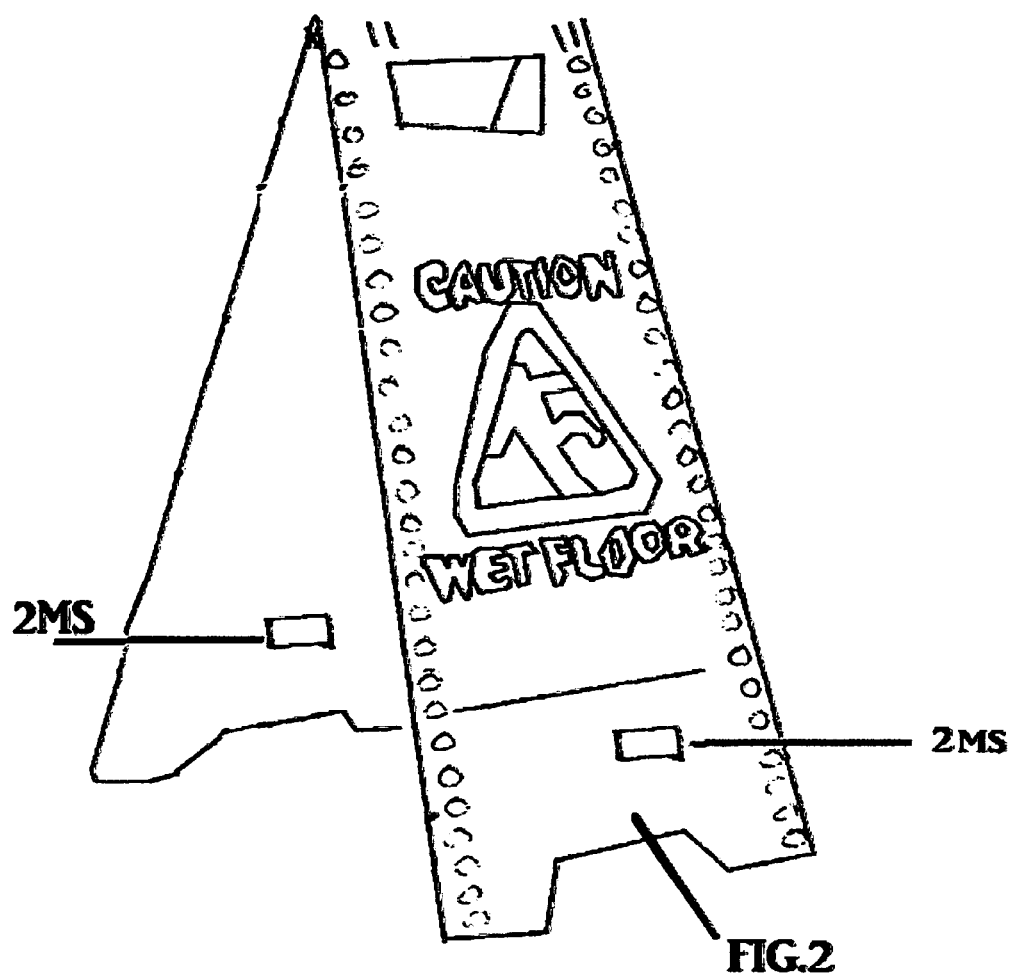
FIG. 2 is an oblique front and back view of the portable wet floor early warning unit of FIG. 1 showing a motion sensor/detector.
Figure 3:
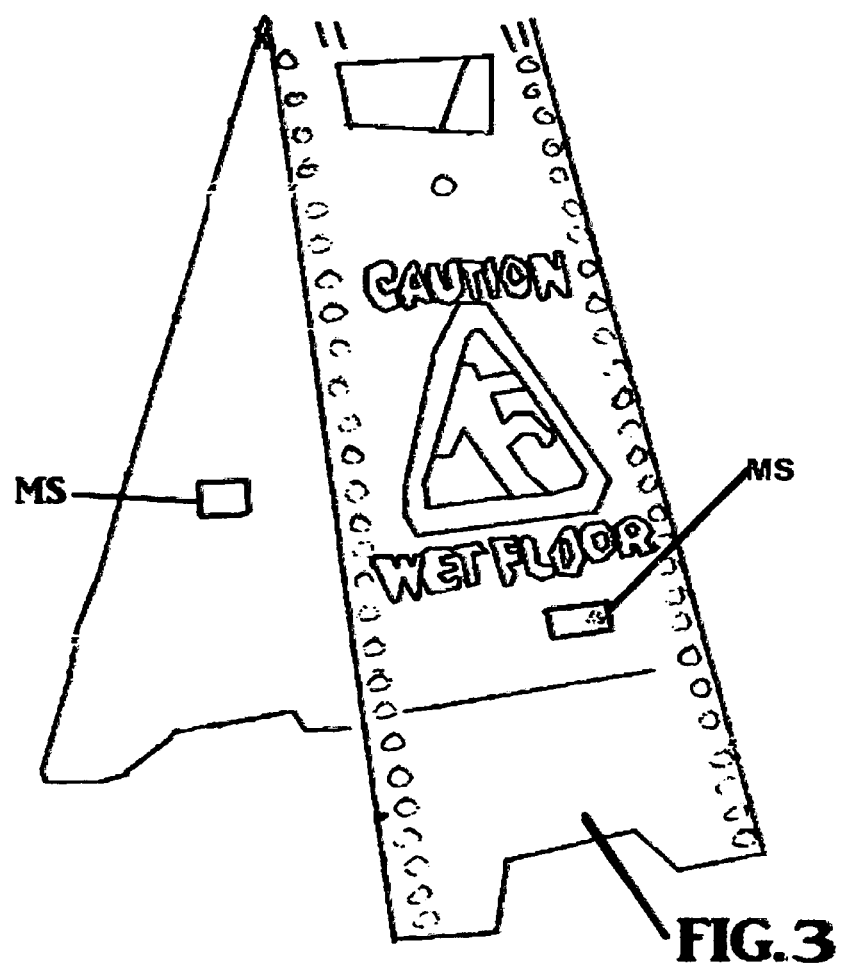
FIG. 3 is an oblique front and back view of the portable wet floor early warning unit of FIG. 1 showing a moisture sensor detection device.
Figure 4:
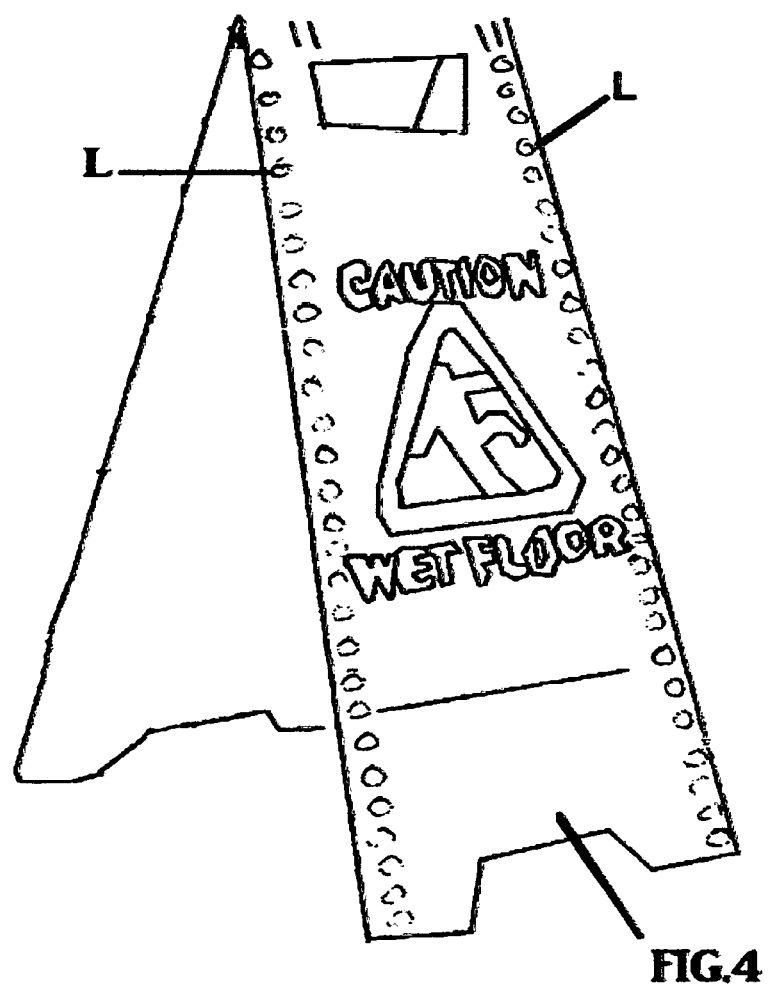
FIG. 4 is an oblique view of the portable wet floor early warning unit of FIG. 1 showing multiple lights on each side of said panels.
Figure 5:
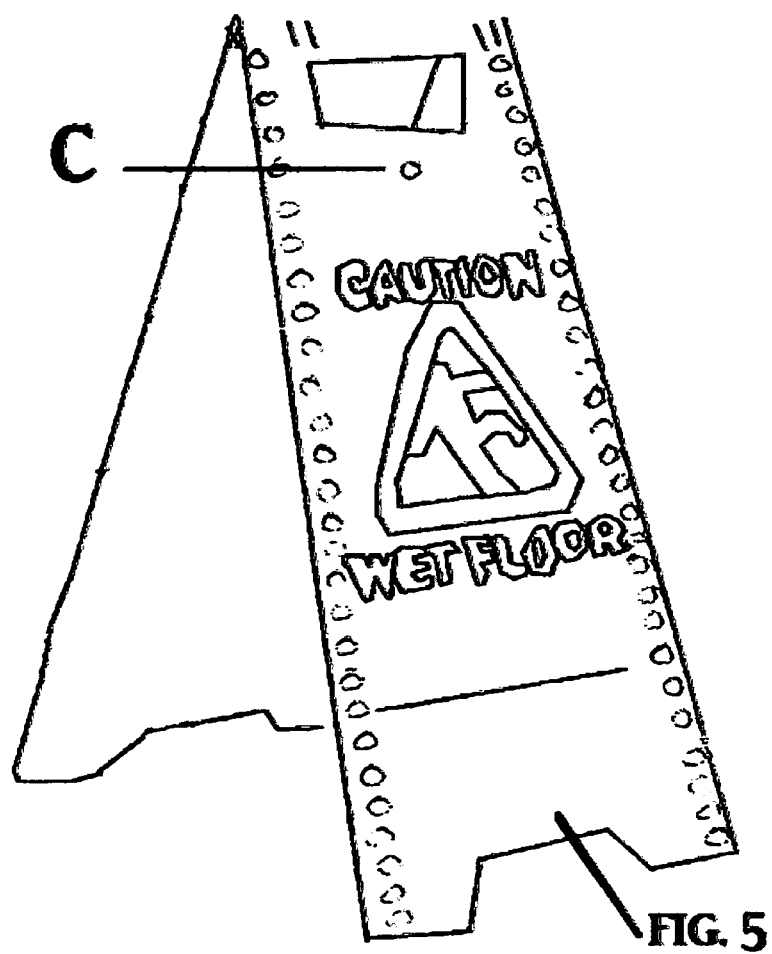
FIG. 5 is an oblique view of the portable wet floor early warning unit of FIG. 1 showing at least one rotating camera.
Figure 6:
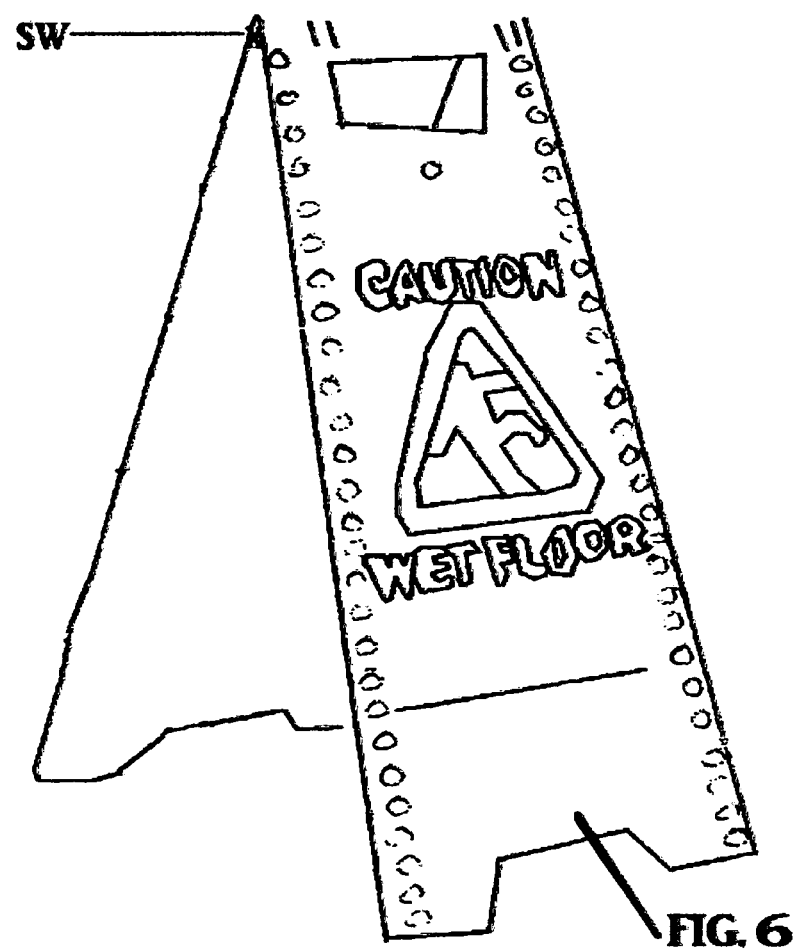
FIG. 6 is an oblique view of the portable wet floor early warning unit of FIG. 1 showing an automatic off and on switch.
Figure 7:
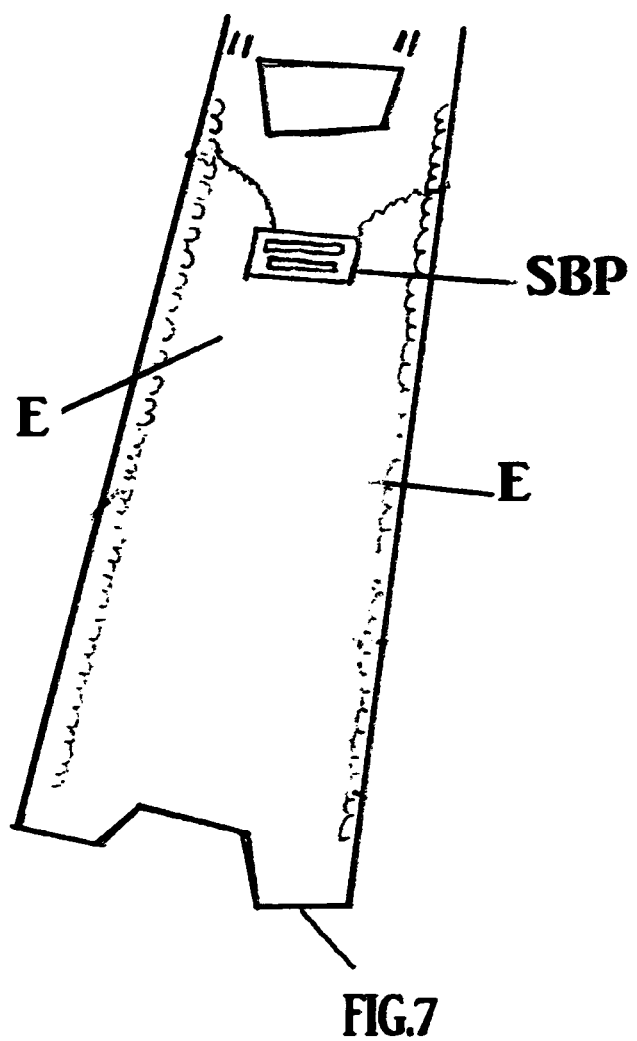
FIG. 7 is an oblique view of the solar battery pack (SBP) for the portable wet floor early warning unit.
Figure 8:
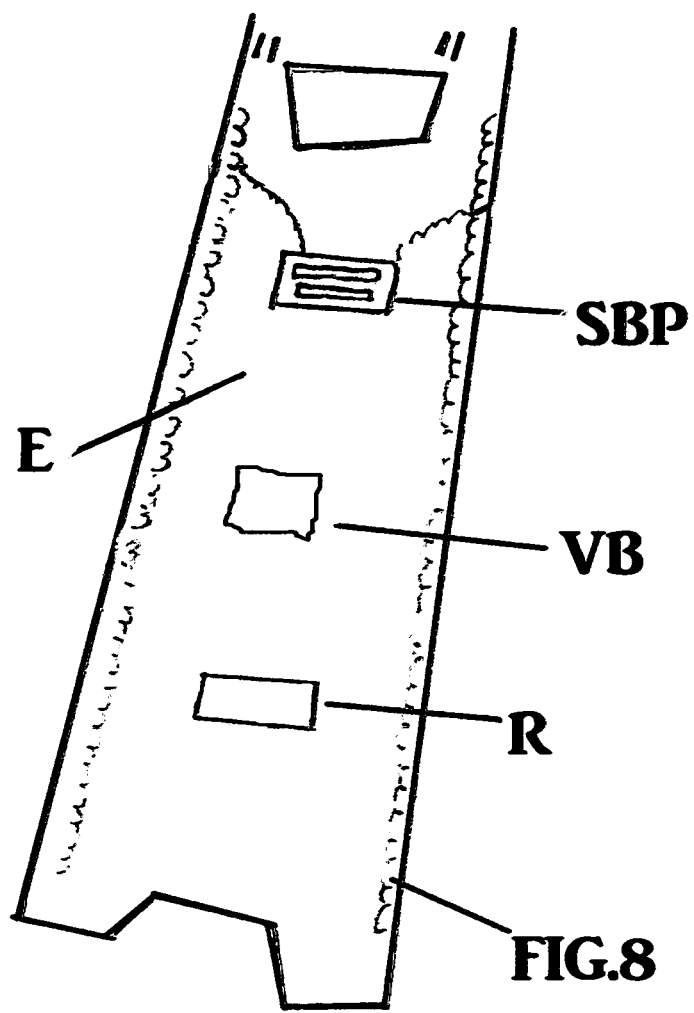
FIG. 8 is an oblique view of the solar battery pack (SBP) and the video recorder (R) on the backside (BSE) of panel.

As shown in FIG. 1, the portable wet floor safety sign device unit of the present invention includes two rigid panels (E) cooperatively connected to one another to form a frame and housing. At least one rotating camera (C) for transmitting visual images to a video recorder (R) as depicted in FIG. 8 of the backside of said panel (E), powered by a solar charged battery pack (SBP) which can be rechargeable, as depicted in FIG. 7 of the backside of said panel (E), The wet floor safety sign device unit shown in FIG. 4 has multiple flashing warning lights (L) on two sides of said panels (E) to alert or give an early warning to the blind and the hearing impaired in the vicinity of said device, powered by the same power source. The audible voice box device (VB) is also connected to the same power source which is activated by the motion sensor circuit (MS) or the moisture sensor circuit (2MS).

The side panels (E) on the portable wet floor safety sign device unit in FIG. 1 can have thereon visual and audible attention getting devices such as a synthesized voice box (VB), or beeper alarm device which may be switched on and off (SW) manually. The portable wet floor safety sign device unit in FIG. 1 is automatically activated when setting the sign out on the floor, and is controlled by a motion sensor (MS), or activated by a moisture sensor (2MS) to sound an alarm.

As set forth heretofore, a preferred embodiment the motion sensor (MS) maybe used not only to activate the audible generating device but also the flashing lights (L). Also the circuit for these can include timer switches and/or delay circuits and/sequencing switches whereby they are activated for selected periods of time and/or in various different sequences that maybe desired.

Selected panels (E) may also be hinged at the top in order for the housing to be collapsed for transport or storage. The hinges may be formed of plastic such as by pin hinges or any other type of hinge. The rigid panels may also be interlocking and secured by friction fit, snap fit, hook and loop fasteners or even tongue and groove engagement.

The on/off switch (SW) can be a single pole/single throw, single pole/double throw or other design and be placed anywhere on the unit. The unit may include a mother board or simple microprocessor which to turn on the voice box (VB), flashing lights (L), camera (C), motion sensor (MS) and moisture sensor (2MS), video recorder (R) when activity is detected. A keypad may be mounted to the housing and/or an infrared sensor or other devices may be included providing means for activation and control by a remote control hand unit.

The foregoing detailed description is given primarily for c clearness of understanding and no unnecessary limitations are to be understood therefrom, for modifications will become obvious to those skilled in the art based upon more recent disclosures and may be made without departing from the spirit of the invention and scope of the appended claims.

I claim:

1. A wet floor safety sign device especially made for the blind and the hearing impaired comprising of at least two rigid panels, an automatic on/off switch disposed at a location where at least two of the said at least two rigid panels meet for automatically activating the wet floor safety sign when set out on a floor, a power supply solar charged battery pack, a motion sensor, at least one rotating camera disposed in one of said at least two rigid panels for transmitting visual images to a video recorder, an audible attention getting voice box device, a moisture sensor, multiple flashing warning lights running vertically along an entire length of two side edges of said at least two rigid panels, a mother board or microprocessor, and a keypad.

2. The wet floor safety sign device of claim 1, wherein the audible attention getting voice box device is mounted on said at least two rigid panels.

3. The wet floor safety sign device of claim 2, wherein said audible attention getting voice box device emits an audible signal and said multiple flashing warning lights emit a lighted visible signal to warn pedestrians.

4. The wet floor safety sign device of claim 2, said audible attention getting voice box device and said multiple flashing warning lights are activated in response to motion of said pedestrians detected by said motion sensor in the vicinity of the device.

\* \* \* \* \*